May 14, 1935.  F. CUTTLE  2,001,094
GATE VALVE
Filed Aug. 5, 1933
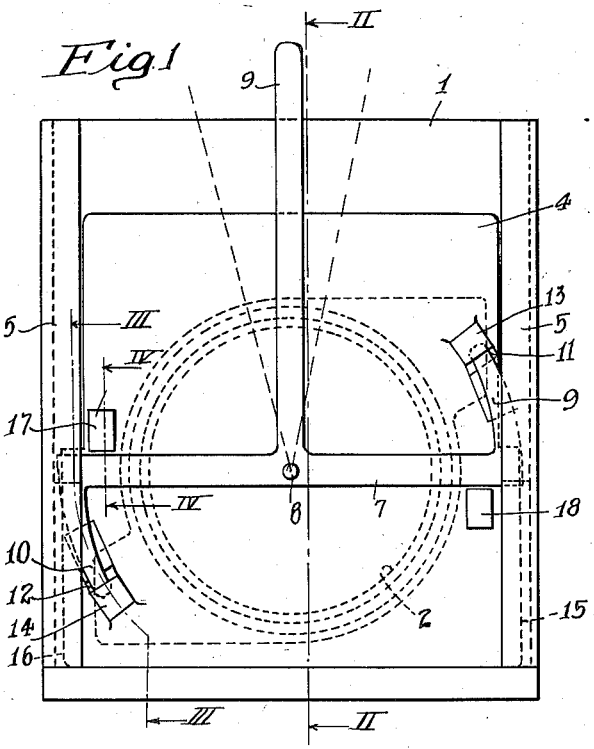
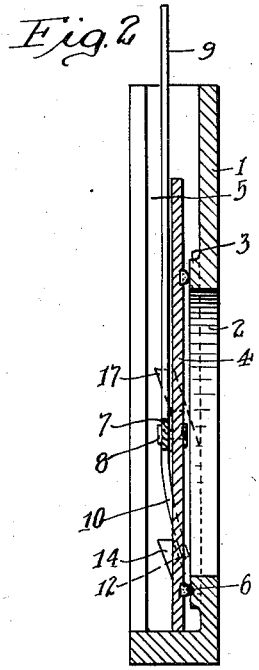
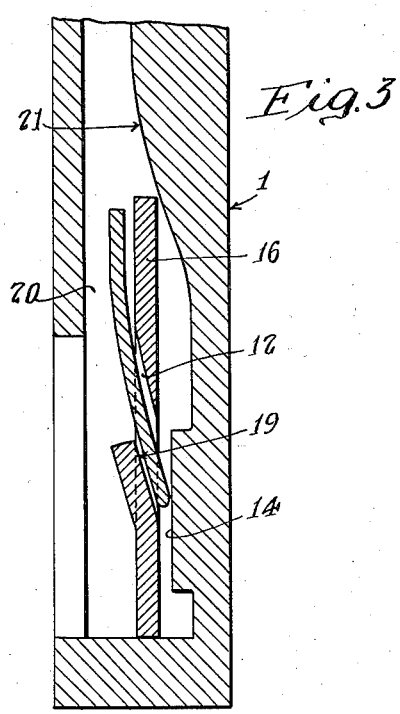
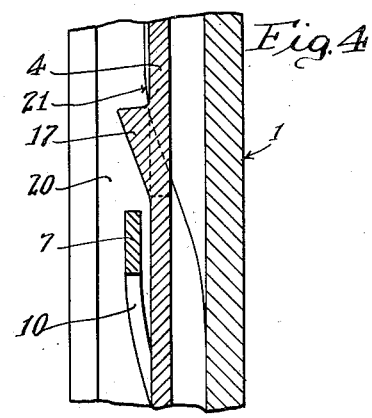
Inventor
Francis Cuttle
By Lyon & Lyon
Attorney Patented May 14, 1935

2,001,094

UNITED STATES PATENT OFFICE 2,001,094

GATE VALVE

Francis Cuttle, Riverside, Calif.

Application August 5, 1933, Serial No. 683,838

3 Claims. (Cl. 251—56)

This invention relates to gate valves of the type commonly used for controlling the flow of water from flumes and pipes and which are used extensively in irrigation systems.

An object of the invention is to provide a simple and inexpensive gate that will close perfectly tight and remain serviceable over a long period of time.

Another object is to provide a gate in which either the gate or the orifice that it closes is provided with a resilient gasket ring of rubber or the like to seal the gate when in fully closed position with means for preventing compression and distortion of the gasket when the valve is locked in partly open position.

Another object of the invention is to provide a particularly simple and effective locking mechanism for locking the gate in any desired position.

Still another object of the invention is to provide a locking mechanism which not only serves to clamp the gate in a desired position but operates to break the gate loose from the valve face preliminary to opening the gate.

The foregoing and other objects of the invention will be fully apparent from the following detailed description which refers to the drawing.

In the drawing:

Figure 1 is a rear elevation of my gate;

Figure 2 is an elevational cross section of the gate taken in the plane II—II of Figure 1;

Figure 3 is a detail section taken along the curved line III—III in Figure 1; and Figure 4 is a detail section taken in the plane IV—IV of Figure 1.

Referring to the drawing, my construction comprises a valve plate 1 which may be of any desired dimensions and forms a portion of the wall of a pipe, flume or water column from which water is to be discharged at a regulated rate of flow. To this end, the plate 1 is provided with a discharge orifice 2 which is preferably of circular shape and is provided with a seat 3 extending circumferentially thereabout. This seat 3 is preferably raised from the rear surface of the plate 1, as shown in Figure 2, and constitutes a rearwardly projecting flange surrounding the orifice 2.

To regulate or stop the flow of water through the orifice 2, a gate 4 is provided. Gate 4 is preferably substantially rectangular in shape, as shown in Figure 1, and of somewhat larger dimensions than the orifice 2 so that it completely covers the orifice when in lowermost position. The upper half of the gate is slightly narrower than the lower half and the edges of the lower half fit in guides 5 which restrain rearward or lateral movement of the gate 4 while permitting vertical movement thereof. The gate 4 is provided with a gasket 6 of resilient material, such as rubber, which is dimensioned to fit against and seal with the valve seat 3 on the plate 1 when the gate 4 is locked in lowermost position.

The gasket 6 might equally well be secured to the valve seat 3 and a cooperating seat provided on the gate 4 for engagement with the gasket.

When the gate 4 is in lowermost position, as shown in Figures 1 and 2, it covers the orifice 2 and the gasket 6 is juxtaposed to the valve seat 3. To force the gate against the seat and produce a perfectly water tight joint, I provide a locking means which wedges the gate 3 toward the plate 1.

This locking means comprises a cross bar 7 which is pivoted at its mid point to the rear side of gate 4 substantially at the center of the circular gasket 6 by a pivot pin 8. A handle 9 extends upwardly from the center of the cross bar to a convenient height for manual operation. The cross bar 7 is of such length that the ends engage the guides 5 on the two sides of the base plate 1. The ends of the cross bar are then extended laterally and curve about the pivot 8 as a center forming arms 9 and 10, respectively. These arms 9 and 10 are bent forwardly at their tips, as shown in the cross sections, and pass through inclined slots 11 and 12 provided therefor in the gate 4. The tips 9 and 10 pass completely through slots 11 and 12 and, when the gate 4 is in lowermost position as shown in the drawing, rest against faces 13 and 14 on the plate 1. These faces 14 are raised to substantially the same level as the valve seat 3 and may be formed continuous therewith, as shown in dotted lines in Figure 1.

From this point on, the construction of my gate can be most readily explained by following through the operation of the device. As shown in the drawing, the gate 4 is in lowermost position juxtaposed to the orifice 2 but is not locked in position. Thus the outwardly projecting edges 15 and 16 on the lower half of the gate lie loosely in the grooves of the guides 5 and the tips 9 and 10 on the cross bar 7, extend through the inclined apertures 11 and 12 in the gate 4 and rest loosely against the faces 13 and 14 on the plate 1. To lock the gate and seal the gasket 6 against the valve seat 3, the handle 9 is moved to the right, thereby rotating the cross bar 7 in clockwise direction. This causes the ends of the bar 7 to ride up on wedges 17 and 18 which are mounted upon the rear ends of the gate 4. The wedges tend to displace the outer ends of the bar 7 rearwardly and they are so displaced until they contact with the rear walls of the guides 5. Thereafter further rotation of the cross bar 7 forces the wedges 17 and 18 and the gate 4, of which they form a part, forwardly toward the plate 1. This forward movement of the gate 4 is also aided by the tips 9 and 10, which bear against the rear faces of the apertures 11 and 12 in the gate through which they pass. The gate will remain indefinitely in locked position because of the friction between the ends of the cross bar 7, the guides 5 and the wedges 18.

If the gate has been locked in closed position for an appreciable length of time, it may tend to stick either as a result of the nature of the gasket 6 or as a result of an accumulation of sand or silt, which may be present in the water. Under such conditions, the gate is loosened by swinging the handle 9 to the left. This movement rotates the cross bar 7 in counterclockwise direction, first shifting the bar off of the wedges 17 and 18 to relieve all pressure tending to hold the valve against its seat. Thereafter further rotation of the bar 7 forces the tips 9 and 10 through the slots 11 and 12 and against the faces 13 and 14 on the plate 1. Because of the forward inclination of the tips 9 and 10, a substantial wedge action is developed between the faces 13 and 14 and the inclined rear surfaces 19 of the apertures 11 and 12. This force is sufficient to dislodge the gate 4 from the plate 1. Thereafter the handle 9 is swung back to central position in which the gate is relieved of all forces tending to bind it in its guides and may be lifted to any desired extent to uncover the orifice 2 to admit a desired flow of water. The gate is locked in position wherever desired by merely shifting the handle 9 to the right as previously described, thereby wedging the ends of the cross bar 7 between the rear walls of the guides 5 and the wedges 17 and 18 and forcing the gate 4 forwardly.

When the gate 4 is in lowermost position, forward movement thereof forces the gasket 6 against the seat 3 to tightly seal the edges about the orifice 2. However, when the gate is in partly open position, it is undesirable to force the gate 4 against the seat 3 because the gasket 6 would engage the seat at only a few points and would be deformed by the localized pressure so that it would not seal tightly in fully closed position. To prevent contact between any portion of the gasket 6 and the base 3, when the gate 4 is locked in partly open position, the guides 5 are provided with forward walls or rails which engage with the edges 15 and 16 on the lower half of the gate 4 and limit forward movement of the gate. This construction is fully illustrated in Figure 3. Thus, it will be observed that the lower portion of the grooves 20 in the guides 4 are relatively wide, permitting the edges 15 and 16 of the gate 4 to move forward a sufficient distance to bring the gasket 6 into engagement with the seat 3. However, the forward walls 21 of the grooves 20 are tapered rearwardly above the tops of the edge portions 15 and 16 of the gate 4 (when the latter is in lowermost position) so that as the gate 4 is lifted upwardly from the position shown in Figures 1 and 3, the edges 15 and 16 are shifted rearwardly in the guides 5. Therefore, when the gate is locked in any position elevated above that shown in Figure 1, the forward movement of the gate is limited by the front walls 21 of the grooves 20 in guides 5 to prevent the gasket 6 from contacting with any portion of the valve face 3. It is entirely unnecessary for the gasket to contact with the valve seat when the gate is in partly open position since a water tight seal is not needed.

Although one specific embodiment of the invention has been described in detail, it is obvious that changes may be made in the construction described without departing from the spirit of the invention and the latter is to be limited only as set forth in the appended claims.

I claim:

1. In a gate valve, a plate member having an orifice therein, a gate, grooved guides on said plate member for receiving the edges of said gate, a cross bar pivotally secured to the rear side of said gate and having tips extending laterally and forwardly from the outer ends thereof, said tips extending laterally in opposite directions, apertures in said gate through which said forwardly extended tips may pass, whereby rotation of said bar in one direction forces said tips through said openings and between the juxtaposed surfaces of the plate member and the gate to dislodge the gate from the plate, and means for rotating said bar about its pivot.

2. A gate valve as described in claim 1 in which the outer ends of said bar extend into the opposite guides on the plate member, whereby rotation of said bar in the opposite direction to that specified in claim 1 wedges said inclined tips between the rear walls of the guides and the rear face of said gate to shift said gate towards said plate.

3. In a gate valve, a plate member having an orifice therein, a gate, grooved guides on said plate member for receiving the edges of said gate, a cross bar pivotally secured to the rear side of said gate and extending, when in crosswise position with respect to the path of movement of the gate, into the guides on said plate member, said cross bar having tips extending laterally and forwardly from the outer ends thereof, said tips extending laterally in opposite directions from said bar, openings in said gate from which said forwardly extended tips may pass whereby rotation of said bar in one direction forces said tips through said openings and between the juxtaposed surfaces of the plate member and the gate to dislodge the gate from the plate, and wedge members on said gate positioned on opposite sides thereof adjacent the ends of said bar whereby rotation of said bar in the opposite direction wedges said inclined tips between the rear walls of the guides and the rear face of said gate and simultaneously forces said cross bar up along the inclined surfaces of said wedge members, whereby said cross bar is locked against rearward movement by said guides and forward pressure is exerted by the cross bar on the gate member at four spaced apart points.

FRANCIS CUTTLE.